United States Patent [19]
Miller et al.

[11] Patent Number: 5,657,575
[45] Date of Patent: Aug. 19, 1997

[54] SNAIL BAIT HOLDER AND SNAIL TRAP

[75] Inventors: Bridget Miner Miller; Albert Miller, both of San Jose, Calif.

[73] Assignee: Terminator Turtle LP, Alameda, Calif.

[21] Appl. No.: 452,978

[22] Filed: May 30, 1995

[51] Int. Cl.$^6$ .................... A01M 1/20; A01M 1/02
[52] U.S. Cl. .................... 43/131; 43/121; 43/132.1
[58] Field of Search ............... 43/121, 131, 124, 43/132.1

[56] References Cited

U.S. PATENT DOCUMENTS

| | | | |
|---|---|---|---|
| D. 326,890 | 6/1992 | Mares | D22/119 |
| D. 328,486 | 8/1992 | Sase | D22/119 |
| 3,550,308 | 12/1970 | Ibach | 43/121 |
| 3,913,259 | 10/1975 | Nishimura et al. | 43/114 |
| 4,328,637 | 5/1982 | Eichmuller et al. | 43/121 |
| 4,438,584 | 3/1984 | Baker et al. | |
| 4,493,161 | 1/1985 | Soloway et al. | 43/107 |
| 4,666,767 | 5/1987 | Von Kohorn et al. | 43/132.1 X |
| 4,747,230 | 5/1988 | Zalesky | 43/121 |
| 4,761,912 | 8/1988 | Dyer et al. | 43/121 |
| 4,793,093 | 12/1988 | Gentile | 43/131 |
| 4,821,452 | 4/1989 | Beckley | 43/131 |
| 4,823,506 | 4/1989 | Demarest et al. | 43/131 |
| 4,826,685 | 5/1989 | Stewart | 43/131 X |
| 4,837,969 | 6/1989 | Demarest | 43/131 |
| 5,033,229 | 7/1991 | Demarest | 43/131 |
| 5,175,958 | 1/1993 | Wedemeyer | 43/121 |
| 5,189,831 | 3/1993 | Miller et al. | 43/121 |
| 5,502,919 | 4/1996 | Ciarletta | 43/131 |

*Primary Examiner*—Joseph J. Hail, III
*Assistant Examiner*—Jay A. Stelacone
*Attorney, Agent, or Firm*—Jack M. Wiseman

[57] ABSTRACT

A snail bait holder and snail trap comprising a vessel and a cover which form a snail bait holding chamber. Disposed within the vessel is a laminated disc for supporting the snail bait. An upper layer of the laminated disc is made of a liquid absorbent material on which is deposited a slurry of snail bait. A lower layer of the laminated disc is made of a non-absorbent, flexible material so that mounds of snail bait are disposed on the upper layer. The vessel has an upwardly directed wall which is cut out to form openings. The cut out sections of the wall are bent outwardly and downwardly to form ramp over which a snail travels to enter the snail bait holding chamber.

4 Claims, 2 Drawing Sheets

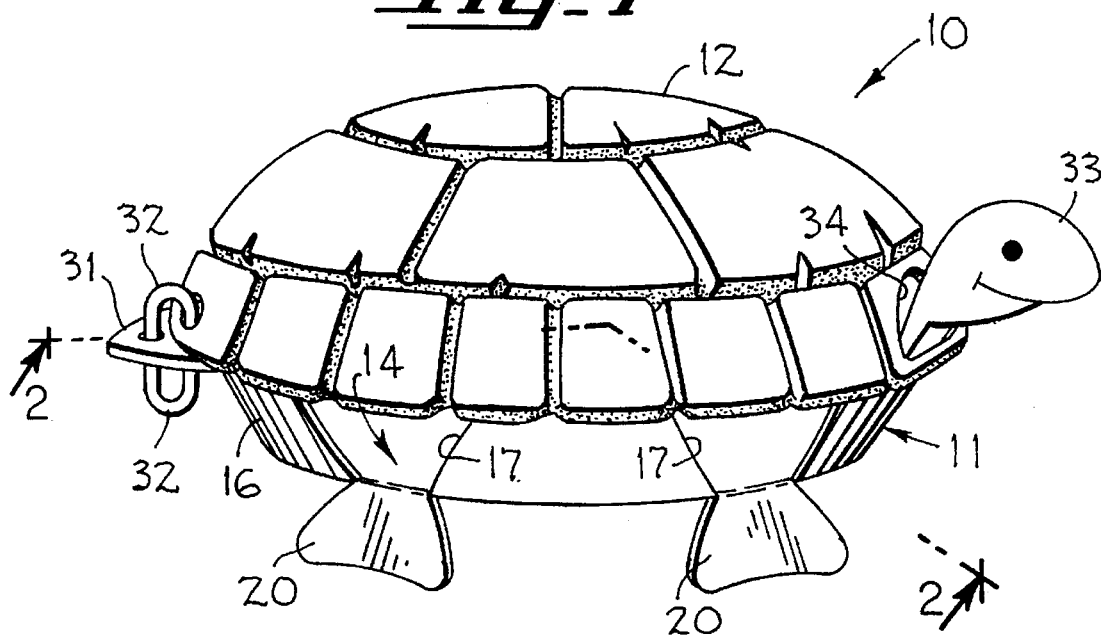
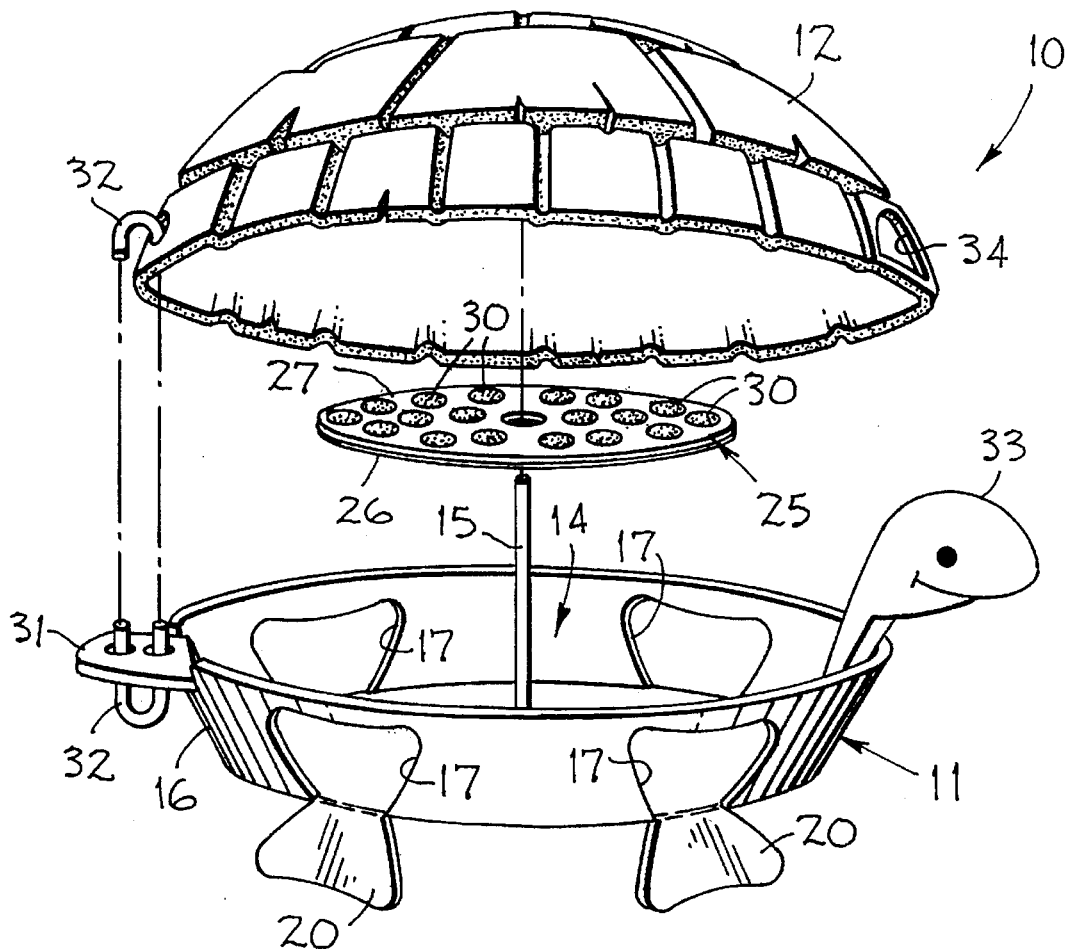

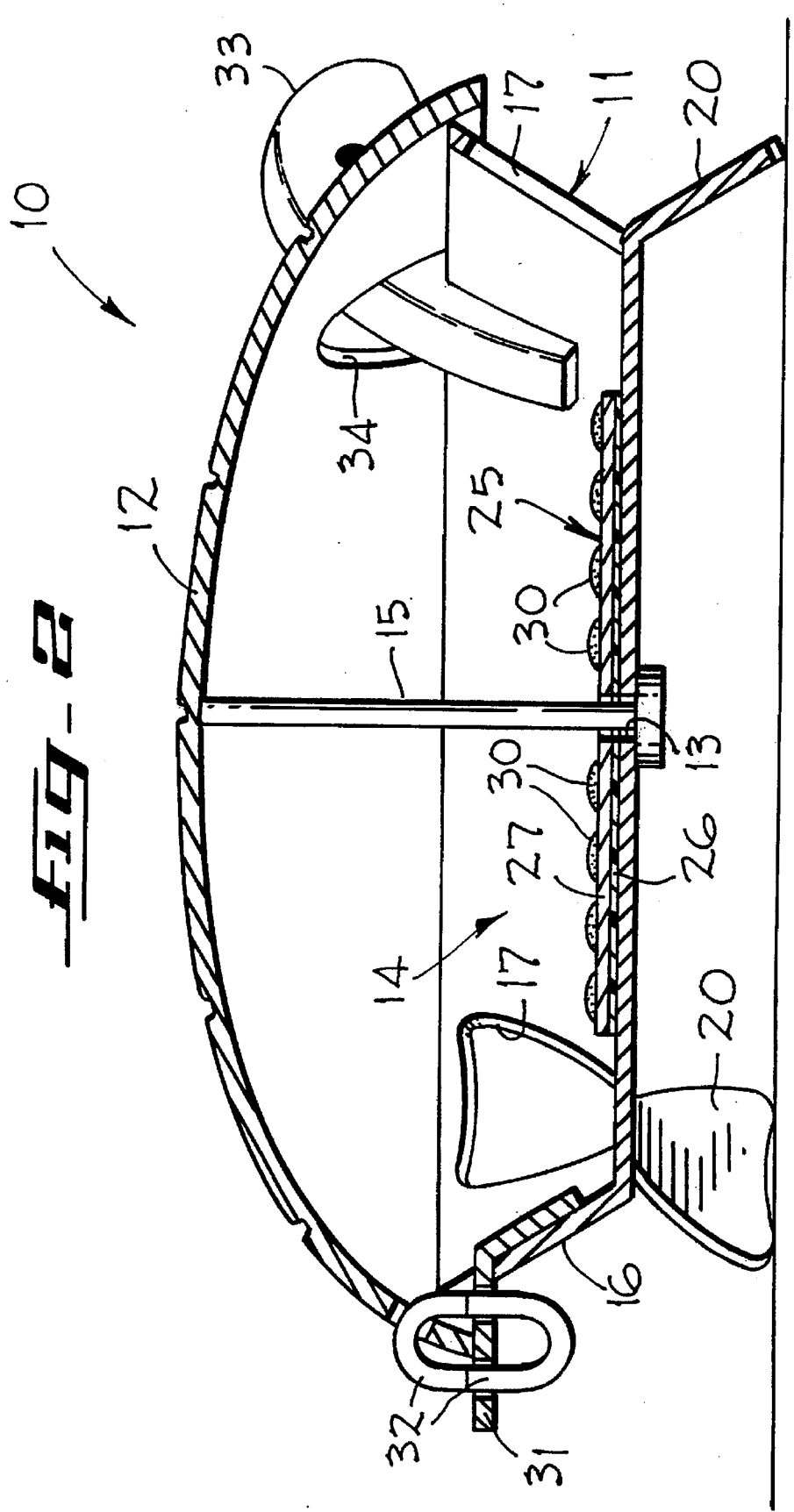

5,657,575

SNAIL BAIT HOLDER AND SNAIL TRAP

BACKGROUND OF THE INVENTION

The present invention relates in general to devices pest control and, more particularly, to a snail bait holder and a snail trap.

It has been a common practice to employ poisonous bait to kill garden variety of snails and slugs. Such bait was in the form of granules, compressed pellets and liquid. The snail and slug bait were commonly dispersed at the edge of planting areas and among bushes. This procedure presented various problems, namely:

1. Rain, high humidity, and watering reduced the effectiveness Of the poisonous bait;
2. It is not desirable to dispose or distribute the poisonous bait during significant winds;
3. The poisonous bait may harm pets and wildlife that may be attracted to the bait; and
4. The poisonous bait is usually water soluable and, hence, present a potential environmental problem.

In the U.S. patent to Dyer et al., U.S. Pat. No. 4,761,912, issued on Aug. 9, 1988, for Snail Trap, there is disclosed a trap for snails and slugs. The trap includes a pan-shaped lower vessel and a pan-shaped upper vessel, which form a bait chamber. The base has a central upwardly extending support defining a receptacle for the bait. Snails and slugs can crawl over an annular wall, through a gap and into a concealed poison chamber.

The U.S. patent to Zalesky, U.S. Pat. No. 4,747,230, issued on May 31, 1988, for Slug Trap, discloses a lower vessel and an upper vessel to form a bait chamber. The upper vessel is releasably attached to the lower vessel by a latching arrangement on diametrically opposite sides of the vessels. The upper vessel shields the bait chamber from rain. The upper vessel extends beyond the perimeter of the bait chamber for making the trap resistant to overturning by animals and wind. An annular extending lip provides a ramp for facilitating the ingress of slugs into the bait chamber.

The U.S. patent to Eichmuller et al., U.S. Pat. No. 4,328,637, issued on May 11, 1982, for Snail Trap, discloses a snail trap. The snarl trap comprises a pan having a perforated bottom, which seats oh the bottom of a snail trap container. An upwardly extending handle of the pan carries a cover and supports it above the open top of the container to serve as a rain shield. The collecting pan is removable from the chamber.

In the U.S. patent to Demarest, U.S. Pat. No. 4,837,969, issued on Jun. 13, 1989, for Bait Station, there is disclosed an insect bait station. The insect bait station includes an apertures, multi-lobed cover, which is fitted over a base having a central bait well. The central bait well is formed by a ramp structure and inner walls intersecting the ramp structure. An insect travels over the ramp structure to reach the well.

SUMMARY OF THE INVENTION

An insecticide holder comprising a vessel and cover which form an insecticide chamber. Disposed within the insecticide chamber is a replaceable, absorbent insecticide support. Disposed on the insecticide support is a slurry of insecticide.

An insecticide holder comprising a vessel and a cover which form an insecticide chamber. Disposed within the insecticide chamber is an insecticide. The vessel is in the form of a pan and has an upwardly directed wall, which has sections thereof cut out and bent outwardly and downwardly to form openings and ramps over which insects travel to enter the insecticide chamber. The ramps provide legs to support the insecticide holder on a supporting surface.

An object of the present invention is to provide a snail bait holder that inhibits pets and wildlife from access to the snail bait disposed within a snail bait chamber.

Another object of the present invention is to provide a snail bait holder that inhibits the snail bait from being subject to rain, watering, winds, and the like.

A feature of the present invention is the use of an absorbent support on which snail bait in the form of a slurry is deposited.

Another feature of the present invention is to provide a laminated disc comprising an upper layer made of absorbent material on which is deposited a slurry of snail bait and a lower layer made of flexible, non-absorbent material to maintain the deposit of the slurry of snail bait on the upper layer.

Another feature of the present invention is to provide a vessel forming a snail bait chamber in which an upwardly directed wall thereof is cut out to form an opening and the cut out section of the wall is bent outwardly and downwardly to form a ramp over which a snail travels to enter the snail bait holding chamber.

Another feature of the present invention is to provide a snail bait holder in which a vessel and a cover form a snail bait chamber. The snail bait holder has the appearance of a turtle or an animal in which the tail end of the turtle is on the vessel and the tail end of the turtle is pivotally attached to the cover and the cover has an opening to receive the head of the turtle, which is on the vessel, for removably securing the cover to the vessel.

BRIEF DESCRIPTION OF THE DRAWINGS

FIG. 1 is a side elevational view of a snail bait holder and snail trap embodying the present invention.

FIG. 2 is a vertical sectional view of the snail bait holder and snail trap shown in FIG. 1 taken along line 2—2 of FIG. 1.

FIG. 3 is an exploded view of the snail bait holder and snail trap shown in FIGS. 1 and 2.

DESCRIPTION OF THE PREFERRED EMBODIMENT

While reference herein is made to the garden variety insect known as a snail, it is to be understood that the invention herein disclosed is equally applicable to slugs and other insects, as well as to snails.

Illustrated in FIGS. 1–3 is a snail bait holder and trap 10, which comprises a vessel 11 and a hollow cover 12. The vessel 11 and the cover 12 are made of suitable material, such as light weight steel. It is apparent that the vessel 11 and the cover 12 can be made of plastic, aluminum or the like. In the exemplary embodiment, the vessel 11 has a pan-like configuration and the cover 12, in the exemplary embodiment, has a generally hemispherical configuration. It is apparent that the cover 12 can have an inverted pan-like configuration. When the cover 12 is supported by the vessel 11, they form a bait holding chamber 14. The cover 12 is disposed over and surrounds the upper rim of the vessel 11 in overlapping relation.

Formed in the center of the base of the vessel 11 is an opening 13. A center post 15 is received by the opening 13.

At the lower end of the center post 15 is a base. In the exemplary embodiment, the base is shaped as a disc. The center post 15, as well as the base thereof, is made of suitable material, such as plastic, and is caused to adhere to the vessel 11 by a suitable adhesive, such as an epoxy. The cover 12 seats on the top of the center post 15 and surrounds the upper rim of the vessel 11 to be supported by the vessel 11.

The vessel 11 has an upwardly directed wall 16. Formed in the upwardly directed wall 16 are openings 17. The sections of the upwardly directed wall 16 cut out to form the openings 17 are bent outwardly and downwardly to form ramps 20. The cut-out sections of the upwardly directed wall 16 have a width sufficient in dimension to enable snails to travel up the ramps 20 and pass through the openings 17 to enter the bait holding chamber 14. The cut-out sections of the upwardly directed wall 16 have a length sufficient in dimension so that the ramps 20 engage the supporting surface and extend a sufficient distance below the base of the vessel 11 to serve as legs for the snail bait holder 10. The dimensions of the openings 17 are sufficiently small to prevent cats, dogs and the like from having access to the bait holding chamber 14. In the exemplary embodiment, there are four ramps 20 and four openings 17.

Disposed within the bait holding chamber 14 and seated on the base of the vessel 11 is a laminated disc 25. A suitable opening is formed at the axis of the laminated disc 25 to receive the center post 15. The diameter of the disc 25 is sufficiently small and the post 15 maintains the disc 25 centrally located within the bait holding chamber 14 so that there is sufficient distance between the disc 25 and the openings 17 to prevent the snail bait on the disc surface from being accessible to cats, dogs and the like.

The laminated disc 25 comprises layers 26 and 27. The lower layer 26 is made of suitable flexible, non-absorbent material such as plastic. The upper layer 27 is made of suitable liquid absorbent material, such as paperboard. In the preferred embodiment, the upper layer 27 is made of chipboard and the lower layer 26 is made of MYLAR. In the exemplary embodiment, the snail bait is a suitable commercially available slurry. An example of a commercially available slurry is metaldehyde. In the preferred embodiment, the snail bait slurry comprises the following:

| Active Ingredients | |
| --- | --- |
| Fleishmann's yeast (brewer) powder | 100 grams |
| granulated sugar | 20 grams |
| bran flour | 400 grams |
| liquid metaldehyde (92%) | 40 grams |
| Inactive Ingredients | |
| methyl cellulose (3000) | 10 grams [binder] |
| propyl parahydroxide benzoate | 10 grams [preservative] |
| water | 240 grams |

In the exemplary embodiment, the chipboard layer 27 is 0.040 inch thick and the MYLAR layer 26 is 0.005 inch thick. The slurry snail bait, in the exemplary embodiment, is deposited on the chipboard layer 27 to form ½ inch round mounds 30.

The slurry of snail bait is absorbed by the upper layer 27 of the disc 25 and is trapped by the lower layer 26 of the laminated disc 25. The non-absorbed portions of the slurry of snail bait adhere to The upper layer 27 and form the mounds 30 of snail bait.

The cover 12 is pivotally attached-to the vessel 11 to have access to the snail bait chamber 14 for replacing the disc 25 and, also, to secure the cover 12 to the vessel 11. Toward this end, the vessel 11 comprises a flange 31 with suitable openings to receive a suitable link 32. The link 32 is also received by a suitable opening in the cover 12. The link 32 is of the snaplock type with one arm spring-loaded for temporarily separating sections of the other arm so that the temporary separation enables the link 32 to be installed in the openings of the vessel 11 and the cover 12. Release of the separable sections of the arms urges the link 32 to be returned to its fully closed state for enabling pivotal movement of the cover 12 relative to the vessel 11. The flange 31 has the appearance of a tail end of a turtle or an animal.

At the diametrically opposite end of the vessel 11 with respect to the flange 31 is an upwardly and outwardly extending member 33 that is removably received by a suitable opening 34 formed in the cover 12. The member 33 has the appearance of the head of a turtle or an animal. The member 33 is configured to form a locking arrangement with the walls surrounding the opening 34 when the member 33 is positioned within the opening 34. Removing the member 33 from the opening 34 enables the cover 12 to be pivoted to provide access to the bait holding chamber 14 of the vessel 11.

What is claimed is:

1. An insecticide holder comprising:
   (a) a vessel having an upwardly directed wall; and
   (b) a cover overlying said vessel to form an insecticide chamber, said vessel comprising a ramp projecting downwardly from a cutout open section for an insect to travel over said ramp through said cutout open section and into said insecticide chamber, said upwardly directed wall of said vessel being cut out to provide said cutout open section, said cutout open section being directed outwardly and downwardly to provide said ramp over which an insect travels to enter said cutout open section.

2. An insecticide holder comprising:
   (a) a vessel having an upwardly directed wall; and
   (b) a cover overlying said vessel to form an insecticide chamber, said vessel comprising a ramp projecting downwardly from a cutout open section for an insect to travel over said ramp through said cutout open section and into said insecticide chamber, said ramp projecting downwardly engaging a support surface to support said insecticide holder, said upwardly directed wall of said vessel being cut out to provide said cutout open section, said cutout open section being directed outwardly and downwardly to provide said ramp over which an insect travels to enter said cutout open section.

3. An insecticide holder comprising:
   (a) a vessel comprising an upwardly directed wall;
   (b) a cover overlying said vessel to form an insecticide chamber;
   (c) a laminated insecticide support disposed in said insecticide chamber comprising an upper liquid absorbing layer on which a slurry of insecticide is deposited and a lower layer of non-absorbent material for maintaining the insecticide on said upper liquid absorbing layer, said upper layer being made of a liquid absorbent material and the deposit of a slurry of insecticide on said upper layer forming a mound of insecticide on said upper layer; and
   (d) means on said vessel for insects to enter said insecticide chamber, said means being a cutout section of said upwardly directed wall to provide an opening for insects to enter said insecticide chamber, said cutout section of said upwardly directed wall being directed outwardly and downwardly to provide a ramp projecting downwardly from said opening for an insect to travel over said ramp through said opening and into said insecticide chamber.

4. An insecticide holder comprising:

(a) a vessel;

(b) a cover overlying said vessel to form an insecticide chamber;

(c) a laminated insecticide chamber support disposed in said insecticide chamber comprising an upper liquid absorbing layer on which a slurry of insecticide is deposited and a lower layer of non-absorbent material for maintaining the insecticide on said upper liquid absorbing layer, the deposit of the slurry of insecticide on said upper layer forms a mound of insecticide on said upper layer; and (d) means on said vessel for insects to enter said insecticide chamber;

wherein said vessel has a base and a central opening formed in said base, and wherein said laminated insecticide support is in the form of a disc and said laminated insecticide support is formed with an axial opening, said insecticide holder further comprising a post received by said axial opening in said laminated insecticide support and by said central opening formed in said base of said vessel, said post being secured to said base of said vessel.

* * * * *